United States Patent [19]
Coffman et al.

[11] Patent Number: 5,380,257
[45] Date of Patent: Jan. 10, 1995

[54] ELECTROHYDRAULIC CONTROL DEVICE FOR A DRIVE TRAIN OF A VEHICLE

[75] Inventors: Michael F. Coffman, Metamora; Paul E. Jantz, Peoria, both of Ill.

[73] Assignee: Caterpillar Inc., Peoria, Ill.

[21] Appl. No.: 37,136

[22] Filed: Mar. 25, 1993

[51] Int. Cl.⁶ ................. B60K 41/02; F16D 43/284
[52] U.S. Cl. ............................. 477/175; 192/103 F
[58] Field of Search ............ 192/0.033, 0.076, 0.096, 192/103 F, 109 F; 477/174, 175, 176

[56] References Cited

U.S. PATENT DOCUMENTS

| | | | |
|---|---|---|---|
| 3,074,524 | 1/1963 | Michell et al. | 192/103 F X |
| 3,831,726 | 8/1974 | Woody et al. | 192/109 F X |
| 3,862,676 | 1/1975 | Schall | 192/109 F X |
| 3,938,631 | 2/1976 | Smith | 192/103 F X |
| 4,718,525 | 1/1988 | Yamaguchi | 192/109 F X |
| 5,022,287 | 6/1991 | Murano et al. | 192/103 F X |
| 5,040,648 | 8/1991 | Mitchell et al. | 192/3.58 |

Primary Examiner—Richard M. Lorence
Attorney, Agent, or Firm—James R. Yee

[57] ABSTRACT

An electrohydraulic control device for a drive train of a vehicle is provided. The drive train includes an engine, a transmission, a source of pressurized fluid, and an input clutch connected between the engine and the transmission. The control device senses the rotational output speed of the engine and responsively engages and disengages the input clutch as a function of the engine speed.

1 Claim, 3 Drawing Sheets

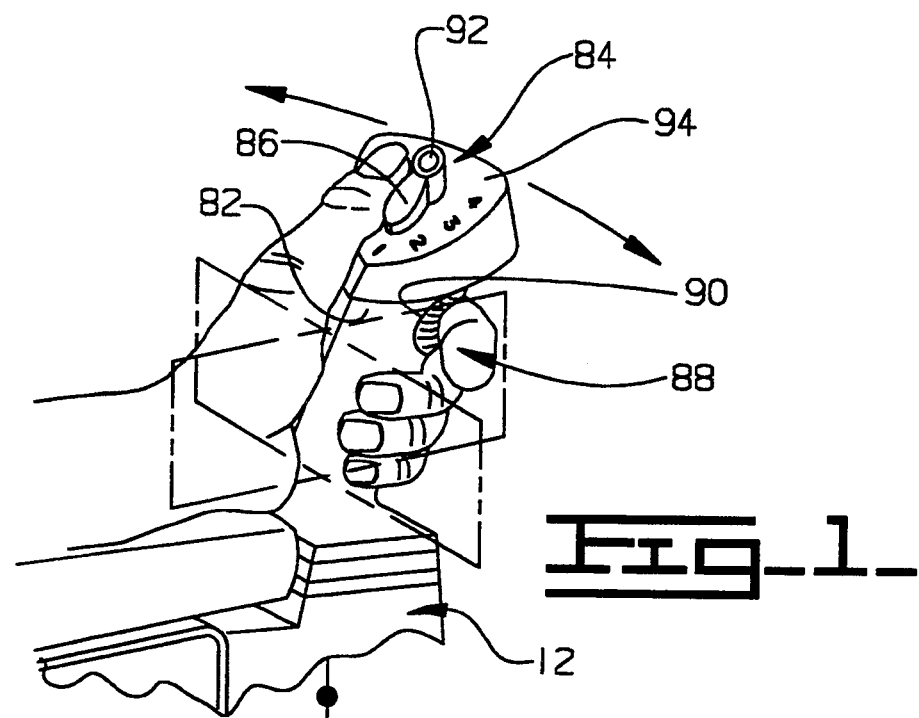
Fig_1_
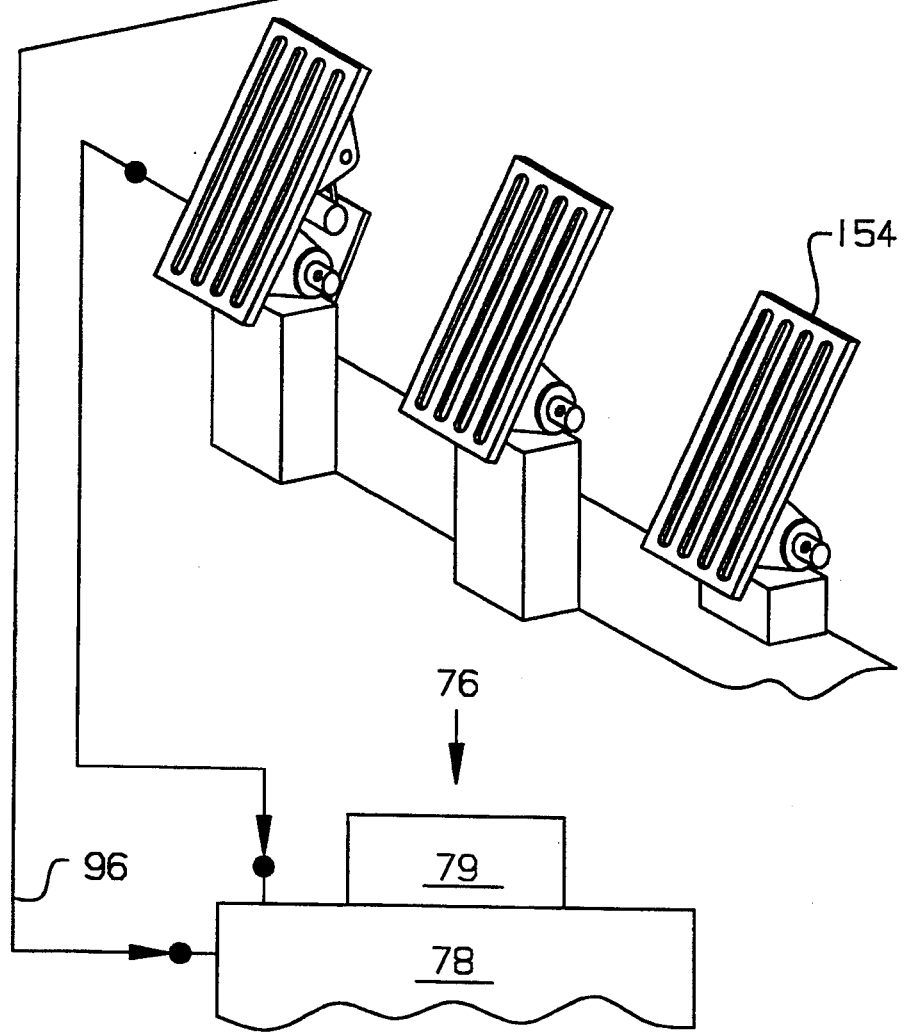

ELECTROHYDRAULIC CONTROL DEVICE FOR A DRIVE TRAIN OF A VEHICLE

DESCRIPTION

1. Technical Field

The present invention relates generally to an electrohydraulic control device and method for controllably operating a vehicle, and more particularly to an electrohydraulic control device having an electronic control module and one or more manually operated actuator mechanisms for affecting certain modes of operation of the drive line of the vehicle through the electronic control module including the engagement of a torque converter input clutch.

2. Background Art

In one conventional mode of "inching" of a vehicle the transmission is kept in gear and the brakes are manually modulated by use of a foot pedal. This is undesirable because it requires considerable operator effort and because the service brakes experience a relatively rapid rate of wear. In another well known mode, when the vehicle's service brakes are applied by the depression of a foot pedal an associated disc and plate type transmission clutch is caused to slip so that the transmission is substantially neutralized. This is most often accomplished by the brake system fluid circuit acting upon an "inching" valve disposed between a pressure source and the clutch, as has been widely used in shuttle-type lift trucks. This is desirable since the vehicle's ground speed is reduced for more precise control, while the speed of the engine is maintained at a relatively high rate to enable a rapid response of the auxiliary equipment operated by the engine. However, controlled slip at a fixed setting of the manually operated control member in both of these modes of operation has heretofore been impractical.

In another conventional method of providing inching capabilities to a vehicle, an input clutch connected between a vehicle's engine and transmission is provided. Typically, the input clutch is actuated through an operator pedal. The operator pedal acts to engage and disengage the input clutch, thereby, varying the power transmitted by the drive train and slowing the vehicle.

However, the engine typically also provides power to vehicle systems other than the wheels, for example, earth digging implements or the steering system. If the operator attempts to accelerate the vehicle while performing some other operation, for example, steering or lifting a load, the load on the engine may be too much for the engine to handle and may "drag" or stall the engine. The increased load may also reduce the vehicle and that of its subsystems response. The increase load will also increase the time required by the engine to accelerate from low idle to high idle.

The present invention is directed at solving one or more of the problems as set forth above.

Disclosure of the Invention

In one aspect of the present invention an electrohydraulic control device for a drive train of a vehicle is provided. The drive train includes an engine, a transmission, a source of pressurized fluid, and an input clutch connected between the engine and the transmission. The control device senses the rotational output speed of the engine and responsively engages and disengages the input clutch as a function of the engine speed.

BRIEF DESCRIPTION OF THE DRAWINGS

FIG. 1 is a diagrammatic and pictorial view of an upper portion of one embodiment of the electrohydraulic control device of the present invention that is separated from the lower remaining portion shown in FIG. 2;

Best Mode for Carrying Out the Invention

Figure 2:
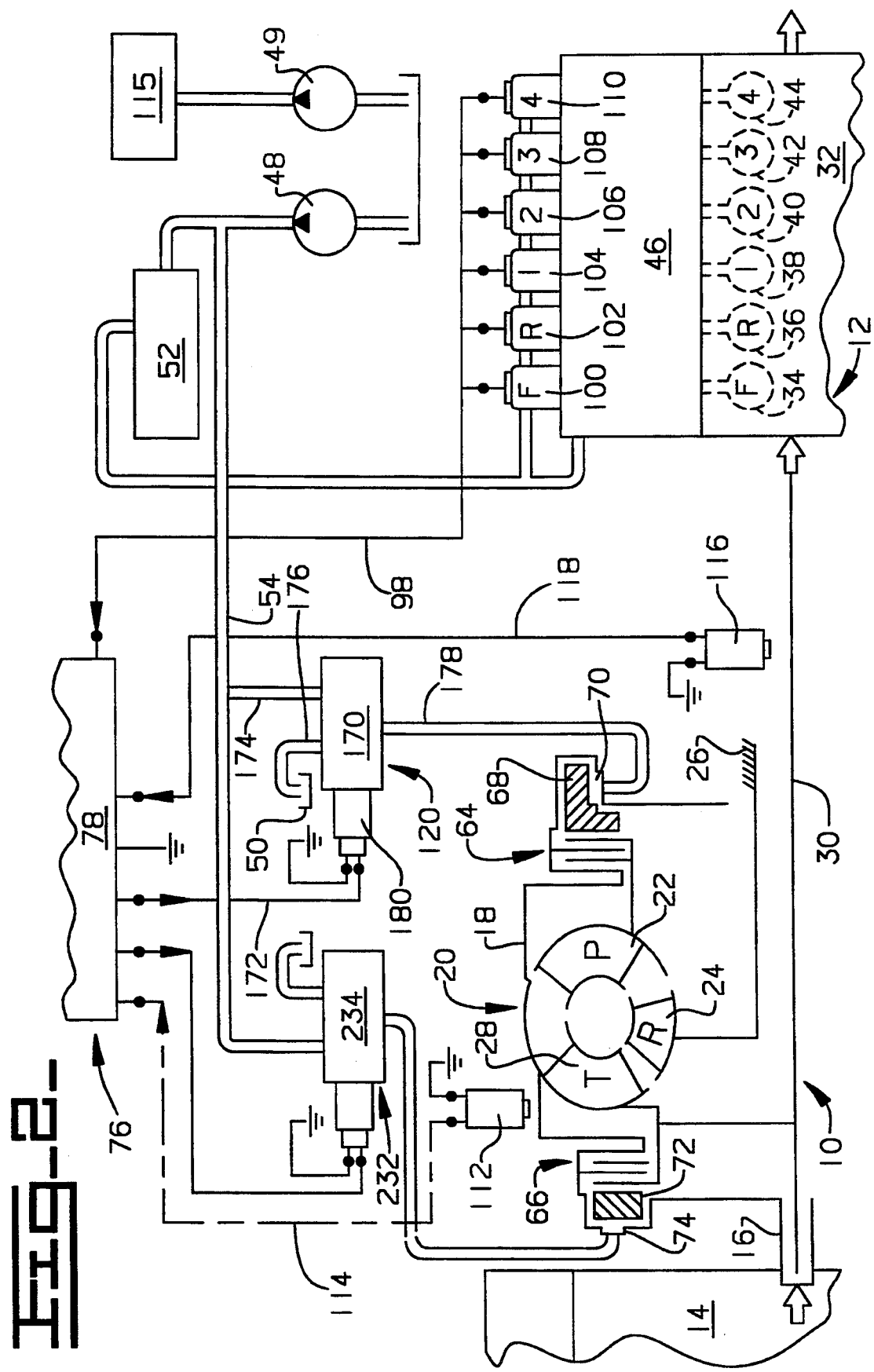
FIG. 2 is a diagrammatic view of the lower remaining portion of the electrohydraulic control device showing a vehicle's drive train that is controlled by an electronic control module as illustrated in FIGS. 1 and 2.

A drive train 10 for a vehicle 12 such as an earthmoving wheel loader or the like is illustrated in FIG. 2. The drive train includes an engine 14 having a shaft 16 connected to drive a housing 18 of a hydrodynamic torque converter 20. The torque converter has a pump (P) or impeller element 22, a reactor (R) or reactor element 24 connected to a stationary support member 26, and a turbine (T) or turbine element 28 connected to a centrally located output shaft 30. The portions located below the axis of the output shaft 30 have been omitted, since it is well known that these bladed converter elements are annular. The output shaft 30 provides the input to a multispeed transmission 32 that preferably has a plurality of interconnected planetary gear sets, not shown, selectively engaged in cooperating groupings by operation of a pair of disc-type directional clutches or brakes 34 and 36, and a plurality of disc-type speed clutches or brakes 38,40,42 and 44 as is schematically indicated.

In the instant embodiment, four forward and four reverse speeds can be obtained with the actuation of a conventional hydraulically operated transmission control 46 having a plurality of pressure controlling valves therein, not shown, that are in selective communication with the clutches or brakes 34,36,38,40, 42 and 44. A charging pump 48 is effective to direct fluid from a tank or reservoir 50 to a conventional priority valve 52 which has a preselected pressure setting, for example 320 psi (2,200 kPa).

A separate charging pump 49 or pumps provides hydraulic power to other vehicle systems, for example, a work implement linkage or steering system 115. The separate charging pump or pumps 49 are also powered by the drive train.

The drive train also has a disc-type input clutch or impeller clutch 64 located between the engine 14 and the torque converter 20 for controllably coupling the rotating housing 18 to the pump element 22, and a disc-type lockup clutch 66 for selectively coupling the rotating housing to the turbine element 28 and the output shaft 30 for a direct mechanical connection that effectively bypasses tile torque converter. The input clutch 64 includes an annular piston 68 subject to movement clampingly against the usual interleaved plates and discs by pressurizing an annular actuating chamber 70, and the lockup clutch 66 includes an annular piston 72 and an annular actuating chamber 74 for engagement purposes.

An electrohydraulic control device 76 is provided for operation of the drive train 10 as is shown in both FIGS. 1 and 2. The control device 76 includes an electronic control module 78 connected to an electrical power source 79 and containing an internal microprocessor, not shown. The term microprocessor is meant to include microcomputers, microprocessors, integrated circuits and the like capable of being programmed. The electronic control module 78 contains sufficient electronic circuitry to convert input signals from a plurality of sensors and switches to a form readable by the microprocessor, and circuitry to generate sufficient power to drive a plurality of solenoids for actuating the transmission 32, the impeller clutch 64, and the lockup clutch 66 according to the microprocessor output signals as will be described later. The microprocessor is programmed with preselected logic rules for receiving one or more manually selected operating signals and a plurality of automatically generated operating signal s.

The upper left portion of FIG. 1 illustrates first actuator means or a first actuator mechanism 80 for operating the transmission control 46 and changing the gear ratio and/or direction of the vehicle 12. Such actuator means includes an upstanding control handle 82 having speed selector means or a speed selector apparatus 84 including an actuating element 86 for changing the gear ratio of the vehicle 12, and directional selector means or a directional selector apparatus 88 including another actuating element 90 for changing the direction of longitudinal travel of the vehicle.

More particularly, in one embodiment the actuating element 86 is movable by an operator's thumb about a pivot axis 92 to any one of four gear ratio positions as indicated by an indicia plate 94 on the control handle 82. A conventional rotary electrical switch, not illustrated within the control handle, directs electrical signals corresponding to these four gear ratio or speed positions through a wiring harness 96 to the electronic control module 78. Similarly, the operator's trigger finger can bias the rockable actuating element 90 to any one of three positions.

In another embodiment, the rotary switch is replaced by an upshift switch and a downshift switch. Actuation of the upshift and downshift switches directs electrical signals to the electronic control module 78. The electronic control module 78 responsively shifts the transmission to the next respective highest or lowest gear ratio.

A three-way electrical switch (not shown) within the control handle, can direct electrical signals through the same wiring harness 96 to the electronic control module 78 corresponding to the FORWARD, NEUTRAL and REVERSE modes of operation of the transmission control 46.

As shown in FIG. 2, another wiring harness 98 extends from the electronic control module 78 to six pilot operating solenoid valves 100, 102, 104, 106, 108 and 110 corresponding to FORWARD, REVERSE, and FIRST, SECOND, THIRD and FOURTH gear ratios respectively, and hereinafter referred to as transmission solenoids.

Alternatively, the directional and/or speed clutches may be mechanically actuatable through a conventional lever arm and control valves.

The electronic control module 78 automatically receives two control signals. As shown in FIG. 2, an engine speed sensor 112 is mounted on a stationary portion of the drive train 10 for providing an electrical frequency signal in a signal line 114 proportionate to the rotational speed of the engine shaft 16 or the rotating housing 18 connected directly thereto. Another speed sensor 116 directs an electrical signal to the electronic control module via a signal line 118 corresponding to the rotational speed of the torque converter output shaft 30, and also the direction of rotation thereof which is carried by the pattern of the signal in a conventional manner. The speed of the torque converter output shaft is equal to tile input speed of the transmission.

Referring to FIG. 1, the electrohydraulic control device 76 includes a control member or depressible left pedal 122 that is rockable about a transversely oriented pivot pin. As the left pedal is depressed from an elevated position to an intermediate position the ability of the input clutch 64 to transmit torque to the pump element 22 from the engine 14 is proportionately reduced. When the left pedal 122 is depressed to a preselected position, braking of the vehicle 12 is initiated through the service brakes.

Furthermore, electrohydraulic control device 76 preferably has a right control member or pedal 154 effective when manually depressed about a pivot pin to increase the speed of the vehicle's engine 14. Alternatively, the right pedal 154 can be depressed to provide an engine speed-reducing function, since it is immaterial whether the right pedal acts as an accelerator or a decelerator.

FIG. 2 shows that tile second actuator means 120 for controlling the degree of engagement of converter input clutch 64 includes a solenoid-operated or electromagnetic impeller clutch valve 170 that is connected to the electronic control module 78 by an electrical signal line 172. This valve is hydraulically connected to the first conduit 54 by a branch supply conduit 174, to the reservoir 50 by a branch drain conduit 176, and to the input clutch chamber 70 by a control conduit 178. In general, the impeller clutch valve 170 is a three-way proportional pressure reducing valve that decreases the pressure in control conduit 178 with an increase in the coil current in the signal line 172 leading to a solenoid 180.

The electrohydraulic control device 76 includes third actuator means or a third actuator mechanism 232 for controllably engaging the lockup clutch 66 at a preselected speed of the converter output shaft 30 to obtain a direct mechanical connection therebetween. The third actuator means 232 includes a solenoid-operated or electromagnetic lockup clutch valve 234 responsive to the electronic control module 78.

The electrohydraulic control device 76 provides manual and automatic control of the drivetrain, in particular, control of the lockup clutch and input or impeller clutch. One such system is disclosed in U.S. Pat. No. 5,040,648 issued to Mitchell et al on Aug. 20, 1991 which is incorporated herein by reference.

In the preferred embodiment, the electrohydraulic control device 76 controllably modulates the control valve 170 to engage and disengage the input clutch as a function of the engine speed during acceleration.

Figure 3:
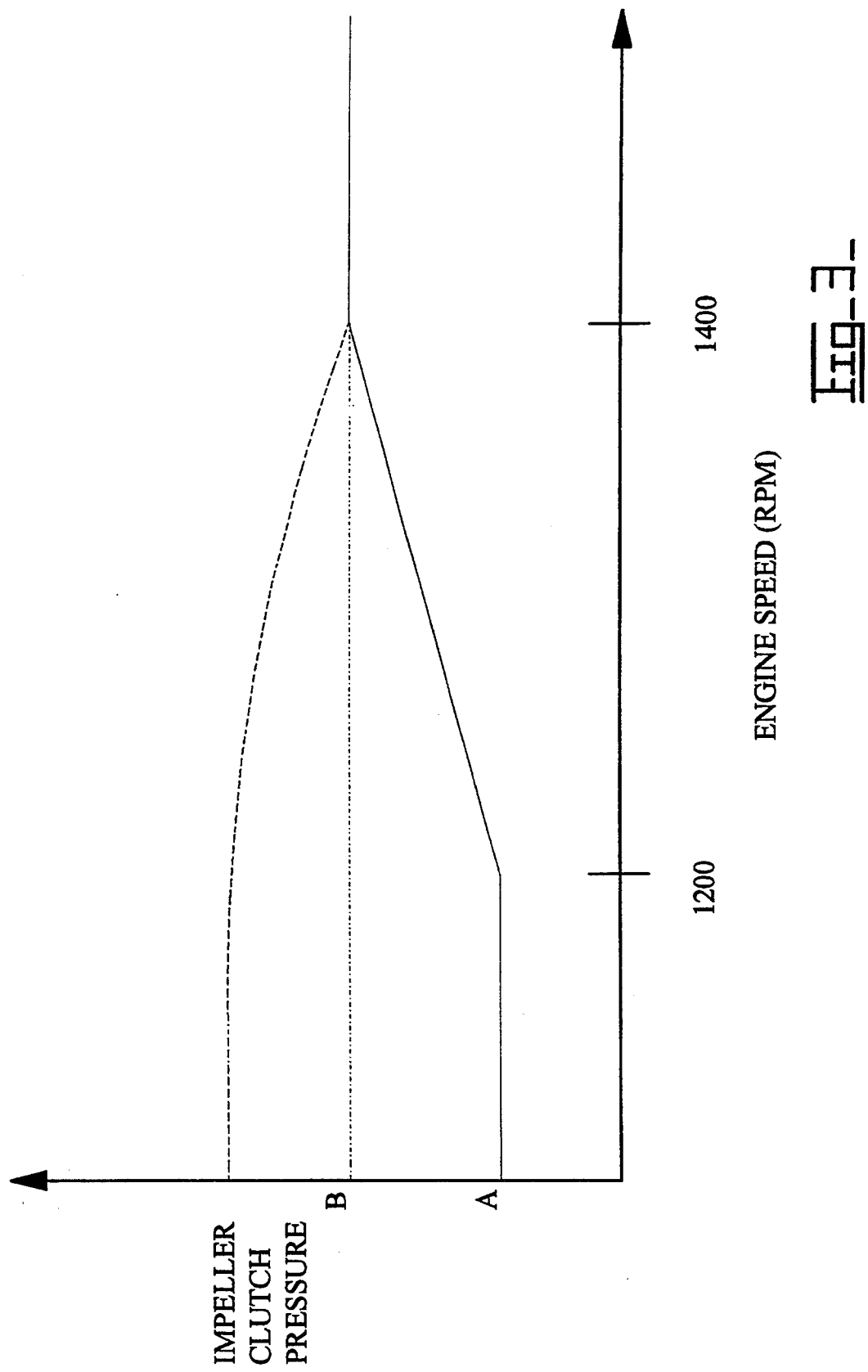
FIG. 3 is a exemplary graph illustrating the modulation of the input clutch as a function of the engine speed, according to an embodiment of the present invention.

With reference to FIG. 3, when engine speed is below a first predetermined value, for example, 1200 RPM, the control valve 170 is actuated to maintain a first input clutch pressure A. When engine speed is above a second predetermined value, for example, 1400 RPM, the control valve 170 is actuated to maintain a second input clutch pressure B. During acceleration between the first and second predetermined values, the valve 170 is actuated to modulate the input clutch pressure between the first and second input clutch pressures as shown. In the preferred embodiment, the input clutch pressure (B) at the second predetermined value is set at the maximum clutch pressure available. The maximum clutch pressure is dependent upon the hydraulic system supplying oil to the clutch. However, clutch pressure B may be set at some lesser value.

Modulation of the clutch pressure is accomplished with a computer lookup table in a manner well known in the art.

Clutch pressures A and B are experimentally determined and are a function of the vehicle type and size, among other factors. For example in one embodiment, clutch pressure A is determined as the minimum pressure required to maintain vehicle position when the vehicle is on an 11 percent grade.

Industrial Applicability

With respect to the drawings and in operation, the present invention provides automatic control of an input clutch during acceleration. The electrohydraulic control device provides automatic and manual control over a drive train. More specifically, manual control over an input clutch is provided by an operator pedal and automatic control is provided in accordance with a set of logic rules.

Additionally in accordance with the present invention, the electrohydraulic control device provides automatic control of the input clutch during acceleration. As discussed above, when engine speed is below a predetermined value, input clutch pressure is maintained at an experimentally derived minimum pressure (A). During acceleration, input clutch pressure is modulated as a function of engine speed. When the engine speed reaches a second predetermine value, input clutch pressure is maintained at a second predetermined pressure (B).

Operator actuation of the operator pedal 122 overrides the modulation discussed above.

Other aspects, objects, and features of the present invention can be obtained from a study of the drawings, the disclosure, and the appended claims.

The invention claimed is

1. An electrohydraulic control device for a drive train of a vehicle including an engine, a transmission, a source of pressurized fluid, and an input clutch drivingly connected between the engine and the transmission, comprising:

means for sensing the rotational output speed of the engine and responsively producing an engine speed signal;

valve means for controllably directing fluid under pressure from the source to the input clutch to controllably engage and disengage the input clutch; and electronic control module means for receiving said engine speed signal and controllably actuating said valve means as a function of said engine speed signal, for comparing said engine speed signal with a first predetermined threshold and responsively actuating said valve means to maintain a first predetermined pressure within the input clutch in response to said engine speed signal being below said first predetermined threshold, for comparing said engine speed signal with a second predetermined threshold and responsively actuating said valve means to maintain a second predetermined pressure within the input clutch in response to said engine speed signal being above said second predetermined threshold, and for modulating pressure within the input clutch between said first and second predetermined pressures in response to said engine speed signal being between said first and second predetermined thresholds.

* * * * *